March 26, 1935. J. R. HERRING 1,995,425
BELT CLAMP DEVICE
Filed Nov. 30, 1934    2 Sheets-Sheet 2
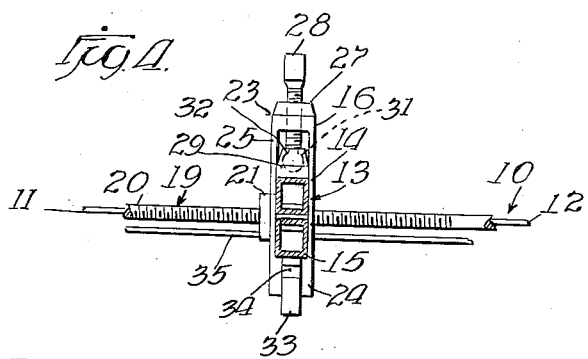
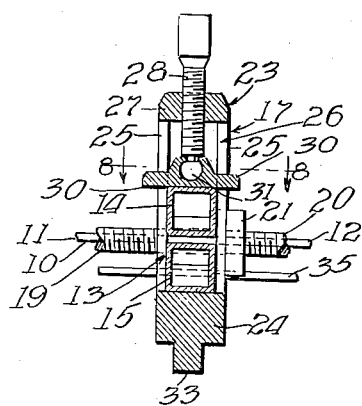
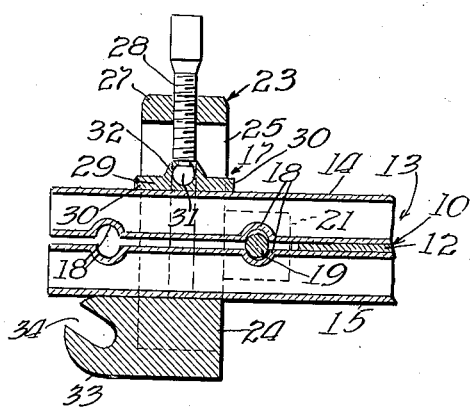
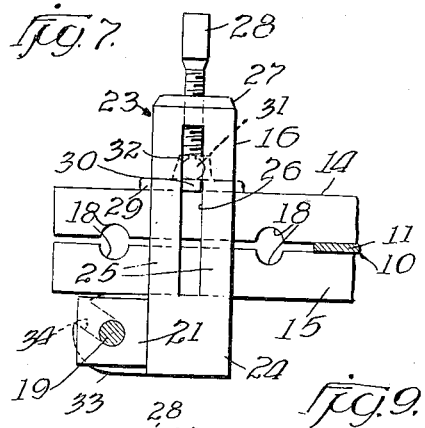
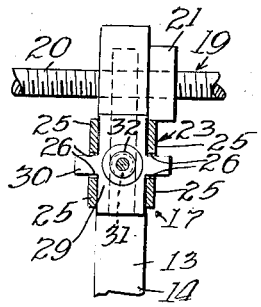
Inventor
James R. Herring
By Edward Fay Wilson
Atty.
Witness:
Harry R. L. White Patented Mar. 26, 1935

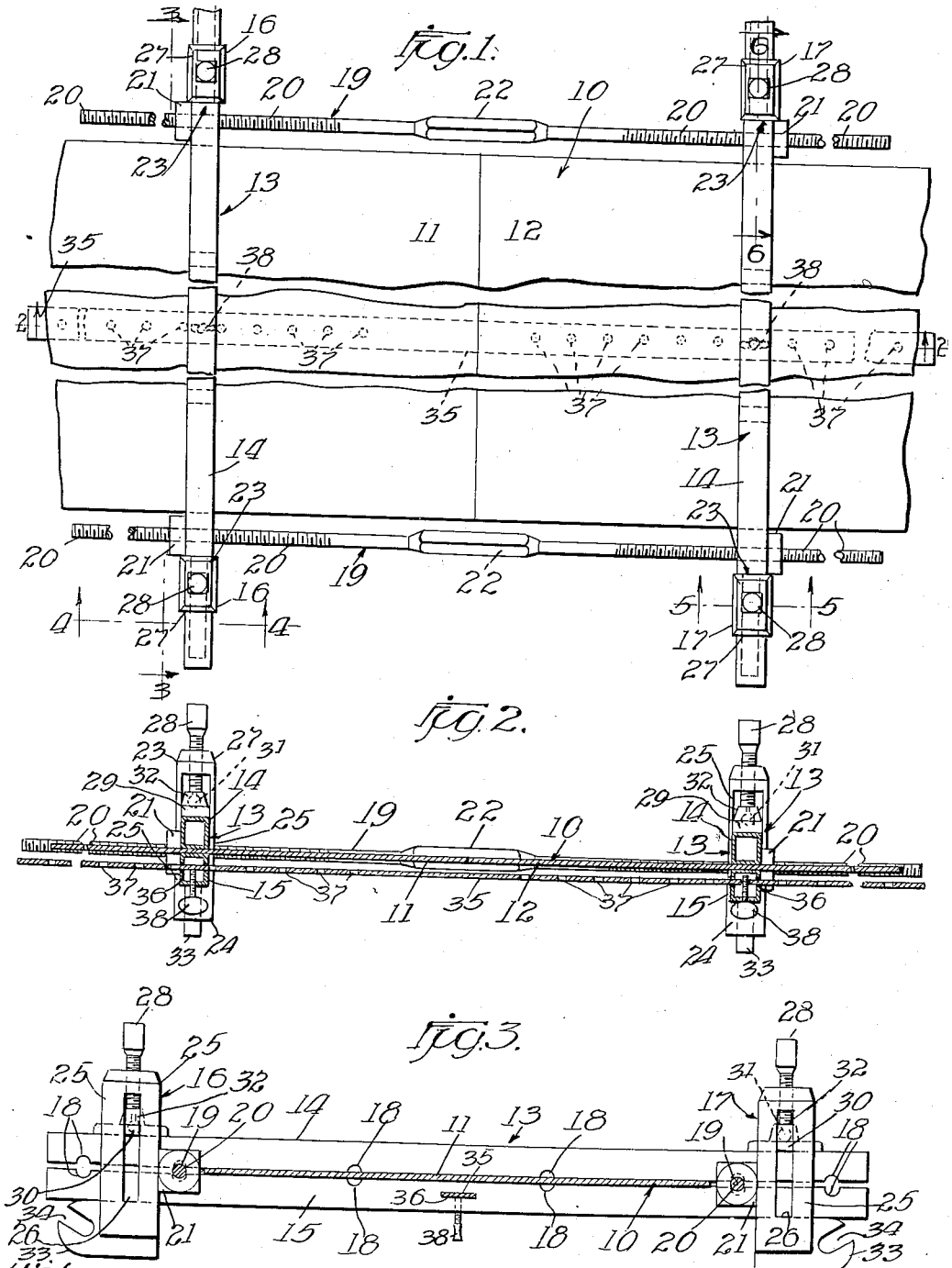

1,995,425

UNITED STATES PATENT OFFICE 1,995,425

BELT CLAMP DEVICE

James R. Herring, Chicago, Ill.

Application November 30, 1934, Serial No. 755,396

6 Claims. (Cl. 254—54)

This invention relates to improvements in belt clamps of the kind which are used for drawing the ends of power transmission or conveyor belts together in the process of securing the ends to each other to make the belts endless.

The object of the invention is to provide a device of the character mentioned especially adapted for use in connection with heavy or wide power transmission or conveyor belts, and which can also be used for smaller belts.

A feature of importance is the ease with which the device can be adjusted for use with belts of different widths.

Another valuable feature relates to the provision of a guide bar which can also be used for a tension bar to hold the ends of the belt in place for securing together when it is desired, for some reason, to temporarily remove the usual tensioning rods.

A further feature of importance relates to a construction which adapts the device for use on conveyor belts which carry relatively large buckets.

To the accomplishment of the above and other objects and advantages, the invention consists in the means herein fully disclosed and particularly pointed out in the appended claims, the accompanying drawings, forming part of this specification, and the following description setting forth in detail one embodiment exemplifying the invention, such disclosed arrangement of parts and devices, and combinations of parts, constituting, however, but one of various applications of the principle of the invention.

In said drawings:—

Fig. 1 is a fragmentary plan view showing my improved belt clamping device as it appears in use on a belt;

Fig. 2 is a longitudinal section on the line 2—2 of Fig. 1;

Fig. 3 is a transverse section on the line 3—3 of Fig. 1;

Figs. 4 and 5 are detail longitudinal sections on the lines 4—4, and 5—5, respectively, of Fig. 1;

Fig. 6 is a detail longitudinal section on the line 6—6 of Fig. 1;

Fig. 7 is a section similar to Fig. 3, but illustrating the use of the hooks on the yokes;

Fig. 8 is a fragmentary, horizontal section on the line 8—8 of Fig. 5; and

Fig. 9 is a view similar to Fig. 3, but illustrating, in an exaggerated manner, the shape of the clamping bars.

A belt 10 is illustrated, in the drawings, having ends 11 and 12 which it is desired to draw together for the purpose of securing the ends to each other to make the belt endless. Usually the belt is in place around the pulleys on which the belt operates and it requires considerable force to draw the ends together especially when the belt is quite wide, or is a heavy conveyor belt such as this present device is particularly devised for.

The device consists of two similar pairs of clamps 13, one adapted for use on each end of the belt, and tension rods for drawing the clamps 13 toward each other.

A description of one pair of the clamps will suffice for both;

Each pair of clamps, as shown, consists of an upper clamping bar 14, a lower clamping bar 15, and a pair of clamping yokes 16—17.

The bars 14 and 15 are preferably made of metal and as shown are hollow for lightness. The opposed edges of the bars are each provided with a series of half round openings 18 which together provide openings between the bars for receiving tension rods or bolts 19. The end portions 20 of the tension rods are screw-threaded, right-hand on one end and left-hand on the other ends and suitable threaded co-operating square nuts 21, are provided, for receiving the ends of the rods. The nuts 21 are positioned on the outer sides of the two pairs of clamping bars for pulling the ends of the belts together.

The yokes 16—17 are positioned on the bars 14 and 15 close to the nuts 21, and the sides of the yokes contact with the adjacent sides of the nuts 21 to prevent them rotating when the rods 19 are rotated to draw the pairs of clamping bars toward each other. Each rod 19, is provided with a polygonally shaped middle portion 22 to which a wrench can be applied for rotating the same.

The yokes 16—17, are duplicates and each consists of an open frame 23, through which the clamping bars 14 and 15 freely pass. The frame 23 consists of a bottom 24, side bars 25, each having a central slot 26, and a top 27. A clamping screw 28, is threaded through the top and its point is engaged with a clamping plate 29 which has projections 30 guided in the slots 26. Preferably the point 31 of the screw 28 is ball-shaped and is received in a suitable depression in the top of the plate 29, the plate being provided with a formed-in ledge 32, above the ball point to hold the screw and plate from separation. By this means the plate does not fall out when the yoke is free of the clamping bars.

As shown in Fig. 9, in a greatly exaggerated form, the clamping bars 14 and 15 are preferably slightly curved lengthwise so that when they are clamped on a belt they will first contact with and bind the middle portion thereof, and then as the ends of the bars are forced toward each other, the binding effect will spread toward the edges of the belt until the belt is firmly and tightly clamped between the bars 14 and 15 for the entire width of the belt.

In using the device it is preferable to arrange the tension rods 19 as near the side edges of the belt as the holes 18 will permit, and arrange the yokes 16—17, as close to the rods as the nuts 21 will permit.

It sometimes occurs that the belt upon which the device is used is a conveyor belt, carrying buckets, which prevent the location of the tension rods 19 between the bars 14—15 in the plane of the belt.

To meet this situation, each yoke is provided on its bottom end with a laterally extending projection 33, provided with an opening 34 for receiving the tension rod. For convenience, preferably, the opening 34 is in the form of a downwardly inclined slot, as shown, into which the tension rod can be placed sidewise.

When the hooked projections 33 are used for the tension rods, and the rods are rotated to draw the ends of the belt together, the fact that the tension rods are out of the plane of the belt tends to tip the clamping bars and thus distort the belt out of its true flat condition.

To prevent this action, I provide a flat bar 35 extending through suitable guide openings 36 in the two lower clamping bars 15. The flat bar 35 is provided in each end portion with a series of holes 37.

In using this bar, it is entered through the guide openings 36 in the two lower clamping bars 15, and it is preferably secured to one bar by a screw 38, carried by the bar 15 and its point entered through one of the holes 37. The other bar 15, also carries a similar screw, but usually this second screw is not tightened, the flat bar 35 sliding freely through the second bar 15 as the belt ends are drawn together.

However, the bar 35 has another function besides that of keeping the clamps from being sprung out of position when the hooked ends on the yokes are used. This other function is to act as a third or auxiliary tension bar at any time that it is desired to hold the belt ends together and at the same time remove the tension rods 19.

At such times, both the screws 38 are entered into holes 37 in the bar 35, and then the rods 19 can be removed without the ends of the belt separating.

The adjustability of the yokes along the clamping bars, the hooked lower ends on the yokes, the flat guide bar 35, used also as a tension bar, and the curved form of the clamping bars, are all points of value in this invention.

As many modifications of the invention will readily suggest themselves to one skilled in the art, I do not limit or confine the invention to the specific details of construction herein shown and described, except within the scope of the appended claims.

I claim:

1. In a device of the kind described, a belt clamp, comprising an upper and a lower clamping bar, clamping yokes for forcing the bars toward each other, the opposed faces of the bars provided with registering openings for receiving tension rods, and said yokes being adjustable longitudinally of the bars as and for the purpose specified.

2. The invention as defined in claim 1, the opposed faces of the bars being curved slightly longitudinally so that when clamped on a belt they will first bind the middle portion thereof.

3. A belt clamping device of the kind described, which includes a pair of clamps as defined in claim 1, and tension rods adapted to be positioned in the openings of said bars at each side of a belt being clamped, the rods being screw-threaded right-hand at one end, and left-hand at the other end, and co-operating nuts for the rods adapted to be positioned in contact with the respective yokes to prevent the nuts turning when the rods are turned.

4. In a belt clamp, a pair of clamping devices each comprising an upper and lower bar, clamping yokes adjustable along the bars, the yokes provided on their lower ends with lateral projections, provided with openings for receiving tension rods for drawing the clamping devices toward each other.

5. The invention as defined in claim 4, and a guide bar adapted to be arranged projecting through openings provided in the lower clamping bars, as and for the purpose specified.

6. In a device for drawing the ends of a belt together, and comprising a pair of clamping devices, each consisting of an upper bar and a lower bar and a pair of clamping yokes, one for each end thereof, tension rods adapted to engage the similar ends of the clamping devices for drawing them together, and a guide bar adapted to be projected through openings provided in the lower bars of said devices, and means for securing the guide bar to both said devices to permit the removal of said tension rods.

JAMES R. HERRING.